US012485509B2

(12) United States Patent
Moreau et al.

(10) Patent No.: US 12,485,509 B2
(45) Date of Patent: Dec. 2, 2025

(54) CLAMP APPARATUS FOR DRILL PRESS

(71) Applicants: Eric Moreau, Tiny Township (CA); Mary Moreau, Tiny Township (CA)

(72) Inventors: Eric Moreau, Tiny Township (CA); Mary Moreau, Tiny Township (CA)

( * ) Notice: Subject to any disclaimer, the term of this patent is extended or adjusted under 35 U.S.C. 154(b) by 497 days.

(21) Appl. No.: 17/742,297

(22) Filed: May 11, 2022

(65) Prior Publication Data
US 2023/0364725 A1    Nov. 16, 2023

(51) Int. Cl.
*B23B 39/00* (2006.01)
*B23Q 3/06* (2006.01)

(52) U.S. Cl.
CPC .............. *B23Q 3/069* (2013.01); *B23B 39/00* (2013.01)

(58) Field of Classification Search
CPC .... B23Q 3/069; B23Q 11/0078; B23Q 11/08; B23Q 11/0816; B23Q 11/0891; B23Q 11/0067; B23Q 3/066; B23Q 3/064; B23Q 3/102; B23Q 3/105; B23Q 3/18; B23Q 2703/12; B23B 39/00; B23B 3/06; B23B 47/28; B23B 47/287; B23B 2247/00; B23B 2260/03; B23B 2260/104
USPC .......................................................... 408/95
See application file for complete search history.

(56) References Cited

U.S. PATENT DOCUMENTS

| | | | | |
|---|---|---|---|---|
| 602,623 A * | 4/1898 | Keller | ................... | B23B 47/287 408/103 |
| 2,214,663 A * | 9/1940 | Dewey | ..................... | B23Q 3/02 269/90 |
| 2,276,819 A * | 3/1942 | Boehmer | ............... | B23Q 1/626 269/305 |
| 2,285,148 A * | 6/1942 | Czajka | ..................... | B23Q 3/00 269/302 |
| 2,879,679 A * | 3/1959 | Neff | ..................... | B23Q 1/5412 269/71 |
| 3,222,052 A * | 12/1965 | Freda | ....................... | B23Q 1/01 269/69 |
| 4,126,081 A * | 11/1978 | Zdeb | ........................ | F16P 1/02 409/134 |
| 4,265,283 A * | 5/1981 | Nash | ........................ | B27C 9/00 144/286.5 |
| 5,980,167 A * | 11/1999 | Chen | ....................... | B23Q 3/02 408/91 |

(Continued)

FOREIGN PATENT DOCUMENTS

CN    205057663 U  *  3/2016  ............. B23Q 11/08
CN    205587998 U  *  9/2016  ............. B23B 47/20

(Continued)

OTHER PUBLICATIONS

English GB2559722A1 Translation (Year: 2018).*

(Continued)

*Primary Examiner* — Nicole N Ramos
(74) *Attorney, Agent, or Firm* — CAPEHART LAW FIRM

(57) ABSTRACT

A clamp apparatus includes a main frame, at least one table attachment bracket, a pair of adjustable clamping members, at least one measurement member, at least one vice attachment bracket, a catch tray and a shield member. The clamp apparatus preferably attaches to any existing drill press table, offers multiple clamping solutions for a work piece and provides a stable tabletop for the work piece.

18 Claims, 10 Drawing Sheets

(56) References Cited

U.S. PATENT DOCUMENTS

| | | | | |
|---|---|---|---|---|
| 6,857,829 | B2* | 2/2005 | Newton | B23Q 11/0046 |
| | | | | 408/67 |
| 8,459,906 | B1* | 6/2013 | Schmitt | B23B 47/287 |
| | | | | 408/97 |
| 9,364,902 | B1* | 6/2016 | Ruggiero | B23B 39/06 |
| 11,040,406 | B1* | 6/2021 | Young | B23D 45/046 |
| 2002/0094248 | A1* | 7/2002 | Smith | B23Q 5/045 |
| | | | | 408/124 |
| 2010/0260569 | A1* | 10/2010 | Ham | B23Q 1/5406 |
| | | | | 409/80 |
| 2015/0314377 | A1* | 11/2015 | Wise | B23B 49/02 |
| | | | | 408/115 R |
| 2021/0121994 | A1* | 4/2021 | Coleman | B23Q 11/0042 |

FOREIGN PATENT DOCUMENTS

| | | | | |
|---|---|---|---|---|
| CN | 108581521 A | * | 9/2018 | B23B 39/12 |
| CN | 109894711 A | * | 6/2019 | B23K 3/08 |
| CN | 209831089 U | * | 12/2019 | B23Q 11/00 |
| CN | 210587530 U | * | 5/2020 | B23H 11/00 |
| CN | 111618325 A | * | 9/2020 | B23B 39/00 |
| CN | 112404483 A | * | 2/2021 | B23B 39/00 |
| CN | 112643371 A | * | 4/2021 | B23Q 3/066 |
| CN | 113351904 A | * | 9/2021 | B23B 39/00 |
| CN | 113787215 A | * | 12/2021 | B23B 41/00 |
| CN | 215051520 U | * | 12/2021 | A47B 57/03 |
| CN | 215325669 U | * | 12/2021 | B65G 57/03 |
| EP | 0764498 A2 | * | 3/1997 | B23Q 1/03 |
| WO | WO-2010098680 A1 | * | 9/2010 | B23B 39/00 |

OTHER PUBLICATIONS

Drawings for Xia CN103659376A (Year: 2014).*
English CN103659376A Translation (Year: 2014).*
Drawings for Xiao CN210231654U (Year: 2020).*
English CN210231654U Translation (Year: 2020).*
English WO2021165201A1 Translation (Year: 2021).*
Drawings for Yu CN108655450A (Year: 2018).*
English CN108655450A Translation (Year: 2018).*
English U.S. Pat. No. 4126081A1 Translation (Year: 1978).*

* cited by examiner

CLAMP APPARATUS FOR DRILL PRESS

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of drill machinery of existing art and more specifically relates to an apparatus for a drill press used particularly for positioning, measuring and clamping a work piece.

RELATED ART

A drill press is a style of drill mounted to a floor or to a work bench. Typically, a drill press includes a base, a table, a drill head, a chuck and a handle. A work piece is usually placed on the table and the operator then uses the handle to move a drill bit (inserted into the chuck) into the work piece. Often, it is preferable to clamp the work piece to the table; however, many current drill presses do not offer effective clamping solutions. Further, it is of great importance to properly position the work piece relative to the chuck/drill bit to enable accurate drilling of the work piece. However, current drill presses do not offer adequate measurement means. In addition to this, often times, cutting fluid or shavings from the work piece end up on the drill press, on the floor below the drill press or in other hard to reach places behind the drill press, resulting in excessive time spent cleaning after drilling the work piece. As such, a suitable solution is desired.

SUMMARY OF THE INVENTION

In view of the foregoing disadvantages inherent in the known drill press art, the present disclosure provides a novel clamp apparatus for a drill press. The general purpose of the present disclosure, which will be described subsequently in greater detail, is to provide an apparatus for fastening about a drill press, particularly a table of the drill press, for use in measuring and clamping a work piece and providing a stable tabletop therefor.

An apparatus for use with a drill press is disclosed herein. The drill press may include a head, a chuck and a table; the table may include table bolt apertures. The apparatus may include a main frame, at least one table attachment bracket, a pair of adjustable clamping members, and at least one measurement member. The main frame may include a top section opposite a bottom section joined together via at least one support and defining a space between the top section and the bottom section. The top section may include a top rear side opposite a top front side and a top left side opposite a top right side. The top left side may include a left clamp track and the top right side may include a right clamp track. The bottom section may include a bottom rear side opposite a bottom front side and a bottom left side opposite a bottom right side.

The at least one table attachment bracket may be attached about the bottom section of the main frame. The at least one table attachment bracket may include a first opening configured for alignment with table bolt apertures of the table and to receive at least one first bolt therethrough, thereby attaching the apparatus to the drill press. The pair of adjustable clamping members may be attached about the top section of the main frame. Each of the adjustable clamping members may include a clamp left side opposite a clamp right side and a clamp length therebetween. The clamp left side of each of the adjustable clamping members may be attached to the left clamp track and the clamp right side of each of the adjustable clamping members may be attached to the right clamp track such that each of the adjustable clamping members are configured for linear movement about the top section. The pair of adjustable clamping members may together be configured to clamp a work piece therebetween.

The at least one measurement member may be attached about the top section of the main frame. The at least one measurement member may span between the top rear side and the top front side and may be located at one of the top left side or the top right side. The at least one measurement member may include indicia configured to aid in positioning of the work piece.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a clamp apparatus for drill press, constructed and operative according to the teachings of the present disclosure.

The various embodiments of the present invention will hereinafter be described in conjunction with the appended drawings, wherein like designations denote like elements.

DETAILED DESCRIPTION

Figure 1:
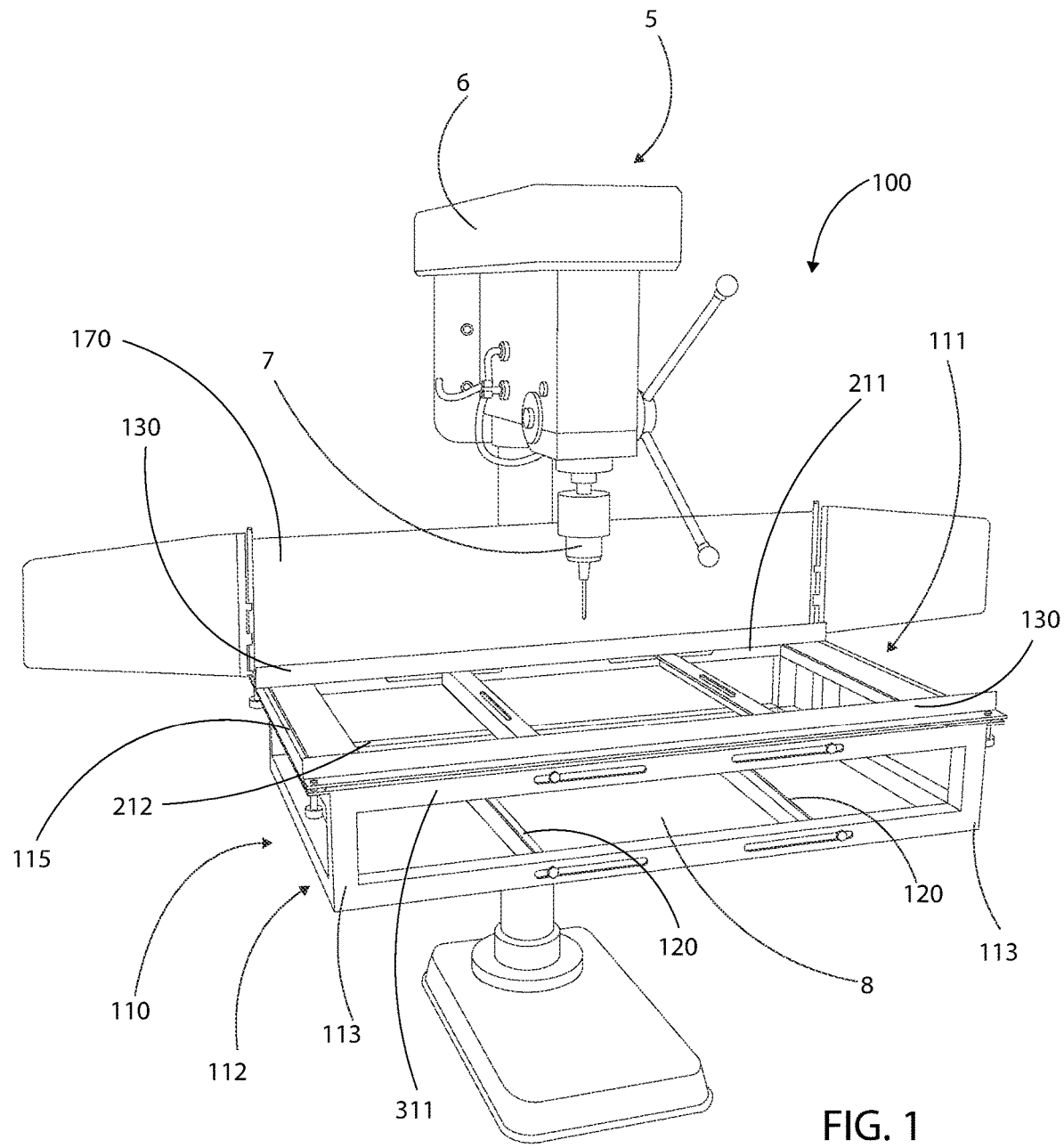
FIG. 1 is a front perspective view of an apparatus being used with a drill press, according to an embodiment of the disclosure.

As discussed above, embodiments of the present disclosure relate to drill press accessories and more particularly to a clamp apparatus for a drill press. The clamp apparatus may preferably attach to any existing drill press table and may offer multiple clamping solutions. For example, the clamp apparatus may include clamping members and also may incorporate an existing vice and existing clamps. The clamping members may be adjusted to clamp any work piece up to 18 inches wide. The clamp apparatus may also include side rulers, enabling exact positioning of a work piece in relation to a drill press bit. In some embodiments, the clamp apparatus may be provided in pieces, enabling a user to assemble the clamp apparatus.

Further, a removable catch tray and back splash guard may be provided. The removable catch tray may collect shavings and/or cutting fluid, and the back splash guard may prevent the shavings and/or cutting fluid from getting into hard to reach spaces. In some embodiments, the back splash guard may include hinged side shields. The clamp apparatus may also be powder coated to prevent rust and to provide an easily cleanable surface. The clamp apparatus enables the clamping of wood, steel tubing, flat bar, plastic materials, etc. and provides a stable tabletop for the work piece.

Referring now more specifically to the drawings by numerals of reference, there is shown in FIGS. 1-10, various views of an apparatus 100. As shown, the apparatus 100 may include a main frame 110, at least one table attachment bracket 120, a pair of adjustable clamping members 130, at least one measurement member 140, at least one vice attachment bracket 150, a catch tray 160 and a shield member 170.

Figure 2:
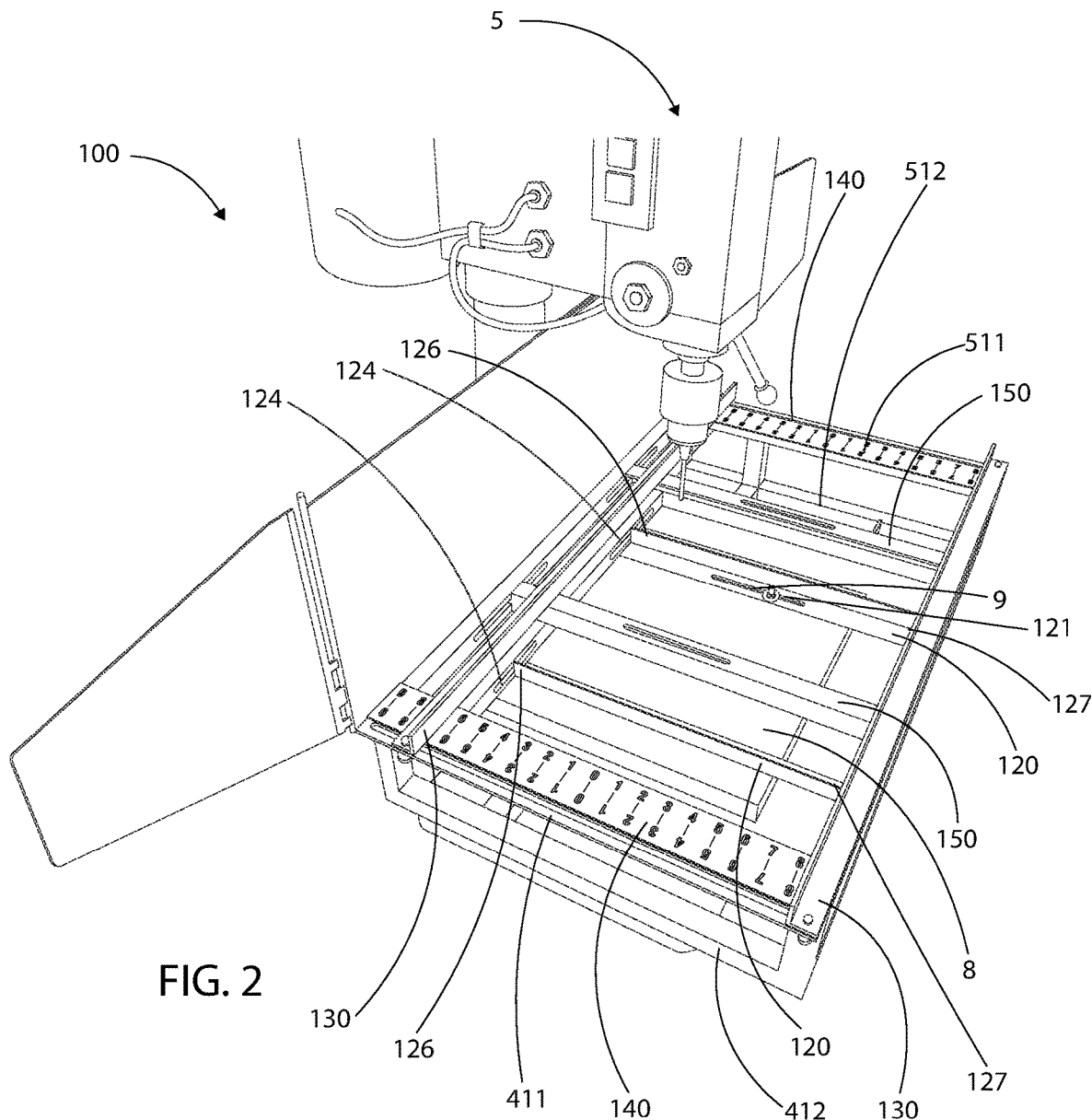
FIG. 2 is a side perspective view of the apparatus attached to a table of the drill press, according to an embodiment of the disclosure.

The apparatus 100 may be configured for use with a drill press 5. For example, as shown in FIG. 1, the apparatus 100 may be used with a floor drill press 5. As shown in FIGS. 1-2, the drill press 5 may include a head 6, a chuck 7 and a table 8, the table 8 including table bolt apertures. It should be appreciated that the apparatus 100 may also be used with a bench drill press. It should also be appreciated that the apparatus 100 may not be limited to use with a drill press.

The main frame 110 may include a top section 111 opposite a bottom section 112 joined together via at least one support 113 having a securing screw 135 or similar device. In some embodiments, the at least one support 113 may include four supports 113 mounted at each corner between the top section 111 and the bottom section 112. As shown, the supports may include vertical support bars. As shown particularly in FIGS. 1-4, the top section 111 may include a top rear side 211 opposite a top front side 311 and a top left side 411 opposite a top right side 511. Likewise, the bottom section 112 may include a bottom rear side 212 opposite a bottom front side 312 and a bottom left side 412 opposite a bottom right side 512. As shown, in some embodiments, the top rear side 211, the top front side 311, the top left side 411 and the top right side 511 may all include horizontal bars bordering a top opening. Similarly, the bottom rear side 212, the bottom front side 312, the bottom left side 412 and the bottom right side 512 may also include horizontal bars bordering a bottom opening.

The at least one table attachment bracket 120 may be attached about the bottom section 112 of the main frame 110. Preferably, as shown in FIG. 2, the at least one table attachment bracket 120 may include a pair of table attachment brackets 120. Each of the table attachment brackets 120 may include a bracket length extending substantially between the bottom rear side 212 and the bottom front side 312 and being parallel to the bottom left side 412 and the bottom right side 512.

As shown, the pair of table attachment brackets 120 may be used to attach the apparatus 100 to the drill press 5. For example, as shown, a first opening 121 may be disposed within each bracket length of the pair of table attachment brackets 120. The first opening 121 may configured for alignment with table bolt apertures 9 of the table 8 and to receive at least one first bolt (or other suitable fastener) therethrough, thereby attaching the apparatus 100 to the drill press 5. In some embodiments, as shown, the first opening 121 may be elongated. This may enable the pair of table attachment brackets 120 to be used with a variety of differently sized tables. In other embodiments, the first opening 121 may be slotted.

Figure 3:
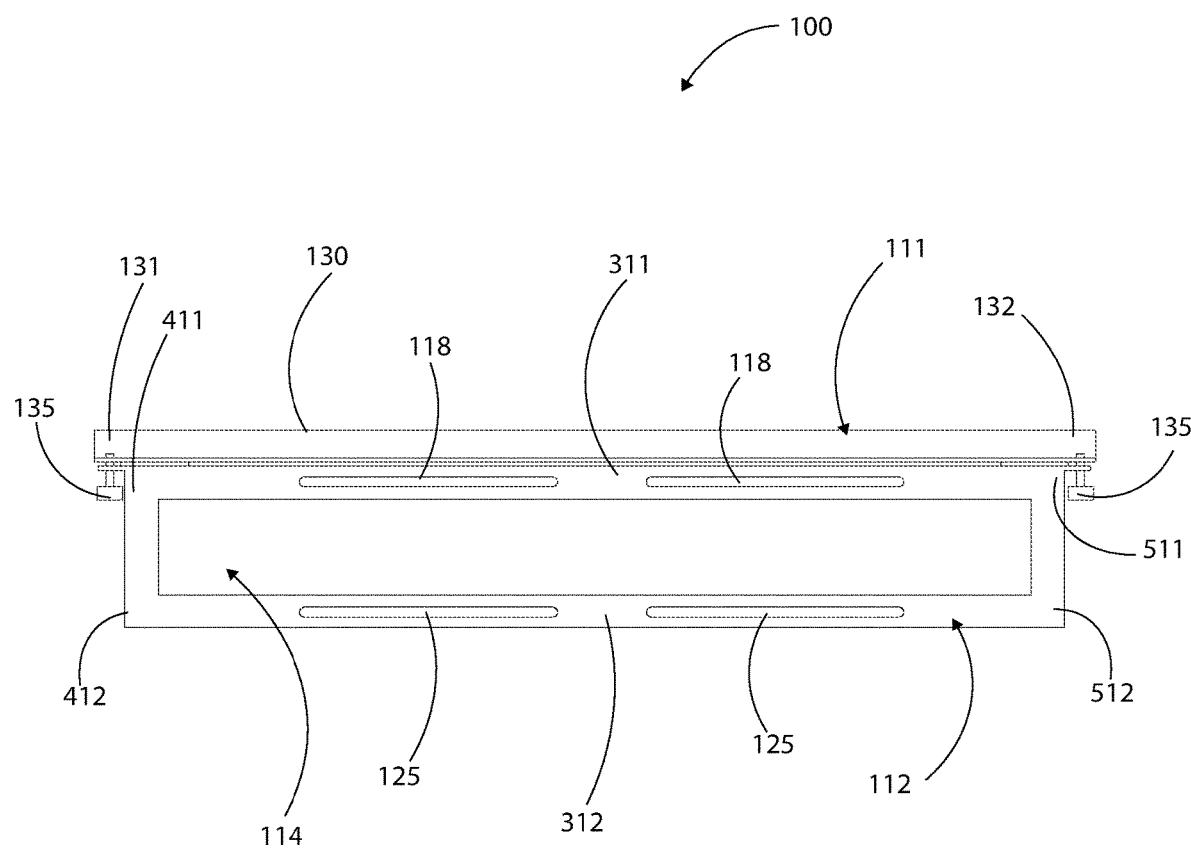
FIG. 3 is a front view of the apparatus illustrating a main frame, a second bracket track and a fourth bracket track, according to an embodiment of the disclosure.

In some embodiments, the bottom rear side 212 may include a third bracket track 124 and the bottom front side 312 may include a fourth bracket track 125. As shown in FIGS. 1-3 particularly, in some embodiments, the third bracket track 124 may include a pair of third bracket tracks 124 and the fourth bracket track 125 may include a pair of fourth bracket tracks 125. As shown, the pair of table attachment brackets 120 may be attached to the bracket tracks 124, 125. For example, a rear bracket end 126 of each of the pair of table attachment brackets 120 may be attached to the third bracket track 124 and a front bracket end 127 of each of the pair of table attachment brackets 120 may be attached to the fourth bracket track 125. This may enable the pair of table attachment brackets 120 to move relative to each other in order to accommodate a variety of table 8 sizes.

Figure 4:
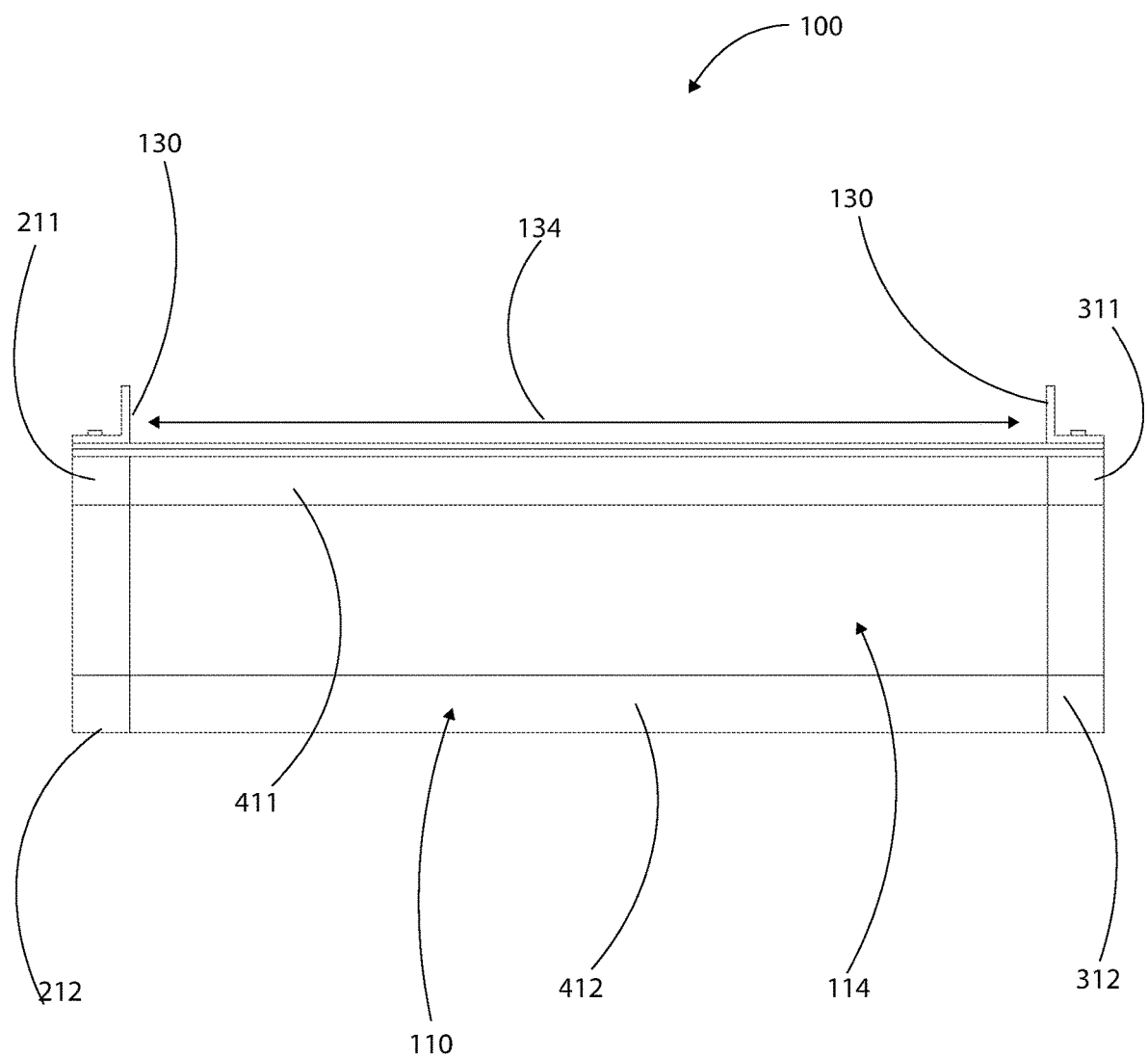
FIG. 4 is a side view of the apparatus, according to an embodiment of the disclosure.
Figure 6:
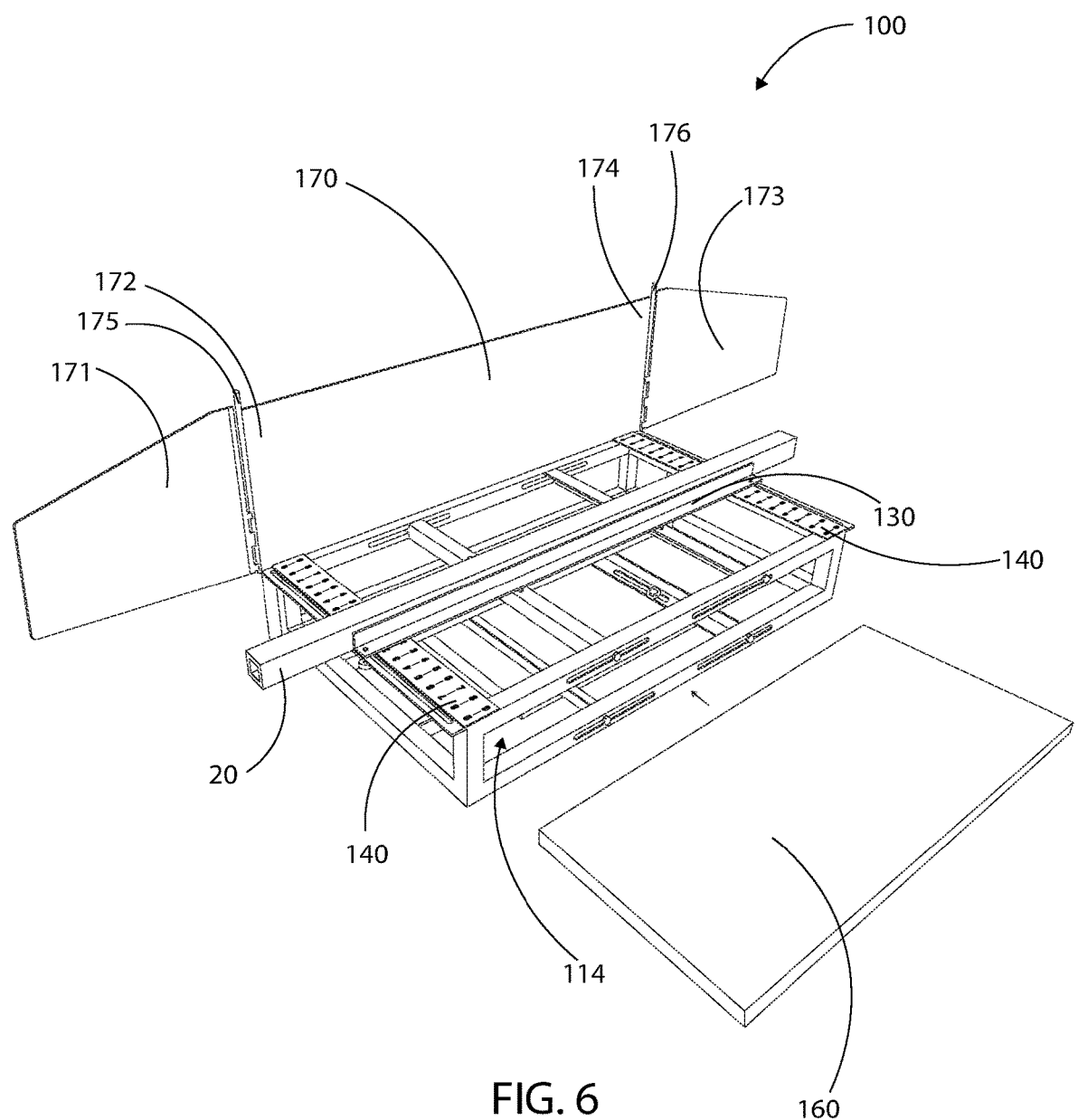
FIG. 6 is a side perspective view of the apparatus illustrating a pair of adjustable clamping members being used to clamp a work piece; and a catch tray, according to an embodiment of the disclosure.

As shown in FIGS. 3-4 particularly, the top section 111 and the bottom section 112 may further define a space 114 therebetween. In some embodiments, as shown in FIG. 6, the catch tray 160 may be provided and configured for removable insertion into the space 114 between the top section 111 and the bottom section 112. As such, the catch tray 160 may be used to catch any shavings and/or cutting fluid, thereby enabling a user to easily remove the catch tray 160 to clean it and insert it back into the space 114. In some embodiments, the catch tray 160 may be inserted through a front of the apparatus 100. In other embodiments, the catch tray 160 may be inserted through a side of the apparatus 100. Further, in some embodiments, to aid in the insertion and removal of the catch tray 160, the catch tray 160 may include a handle.

Figure 5:
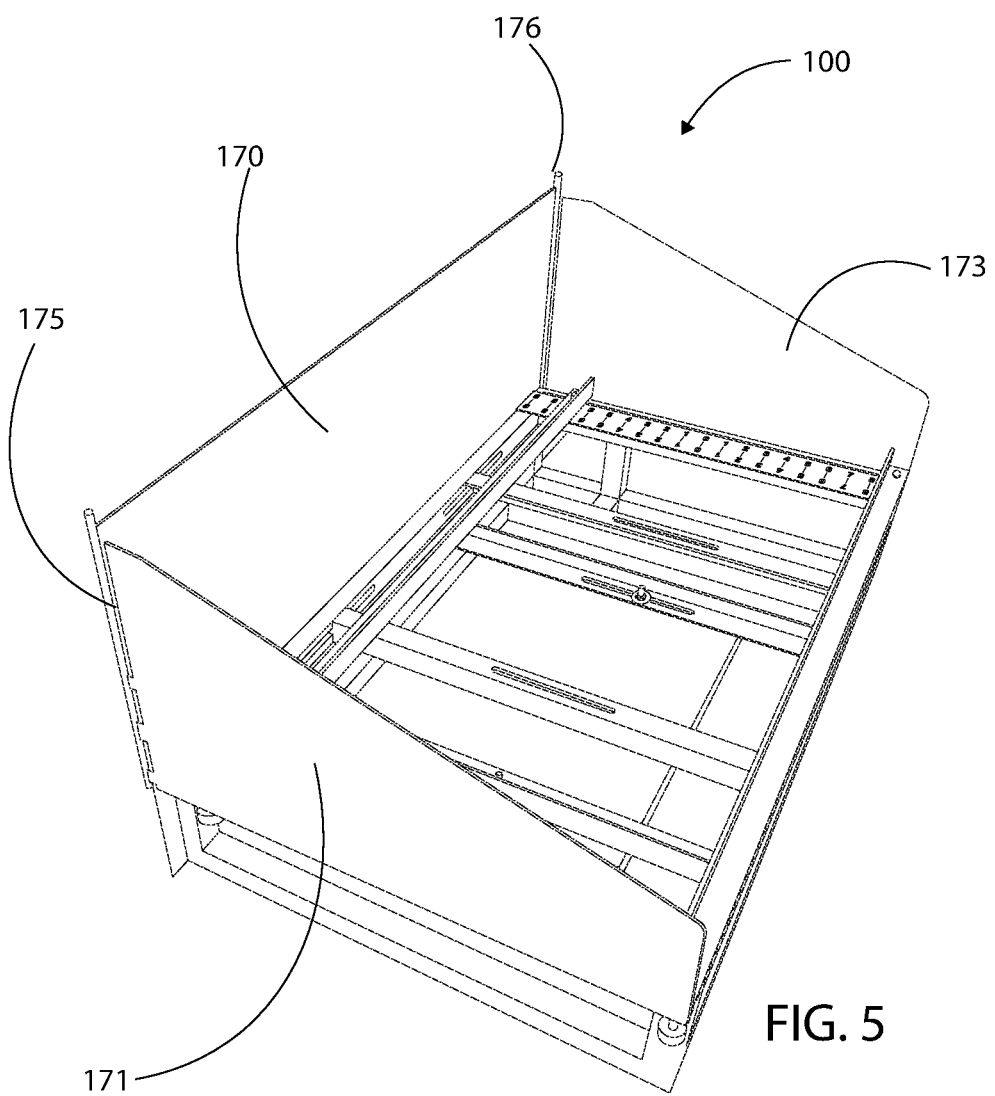
FIG. 5 is a side perspective view of the apparatus illustrating a shield member with side panels covering sides of the main frame, according to an embodiment of the disclosure.

Further, as shown in FIGS. 5-6 particularly, the apparatus 100 may include the shield member 170. As shown, the shield member 170 may be attached about the top rear side 211 of the top section 111 and may extend upwardly and substantially perpendicular thereto. The shield member 170 may act as a 'backsplash' for the apparatus 100 and the drill press 5, preventing the shavings and/or cutting fluid from being dispersed into hard-to-reach places. In some embodiments, the shield member 170 may include a height of at least 6 inches-however it should be appreciated that the shield member 170 is not limited to this height.

In some embodiments, the shield member 170 may be removable. This may enable the user to remove the shield member 170 when needed, to prevent the shield member 170 from inhibiting the drilling of large work pieces. In other/additional embodiments, the shield member 170 may be foldable. For example, the shield member 170 may be hinged at a center thereof and configured to fold in half. Further, as shown, the shield member 170 may include a first side panel 171 attached about a shield left side 172, and a second side panel 173 attached about a shield right side 174. In some embodiments, the first side panel 171 and the second side panel 173 may be pivotably attached to the shield member 170, enabling the side panels 171, 173 to be moved to (at least partially) cover sides of the apparatus 100 (as shown in FIG. 5) and drill press 5; and moved back to prevent the side panels 171, 173 from inhibiting drilling. For example, the side panels 171, 173 may be attached to the shield member 170 via hinges 175, 176. Further, in some embodiments, the side panels 171, 173 may be lifted up to allow long work pieces 20 be used with the drill press 5.

As above, the apparatus 100 may be used for clamping a work piece 20. Preferably, the apparatus 100 may utilize various means to clamp the work piece 20. For example, as shown, the pair of adjustable clamping members 130 may be attached about the top section 111 of the main frame 110 and each of the adjustable clamping members 130 may include a clamp left side 131 opposite a clamp right side 132 having a length therebetween. Preferably, as shown in FIGS. 5-6 the pair of adjustable clamping members 130 may be used to clamp work pieces 20 having various sizes. As such, the pair of adjustable clamping members 130 may be configured to move independent of each other about the top section 111 of the main frame 110.

Figure 7:
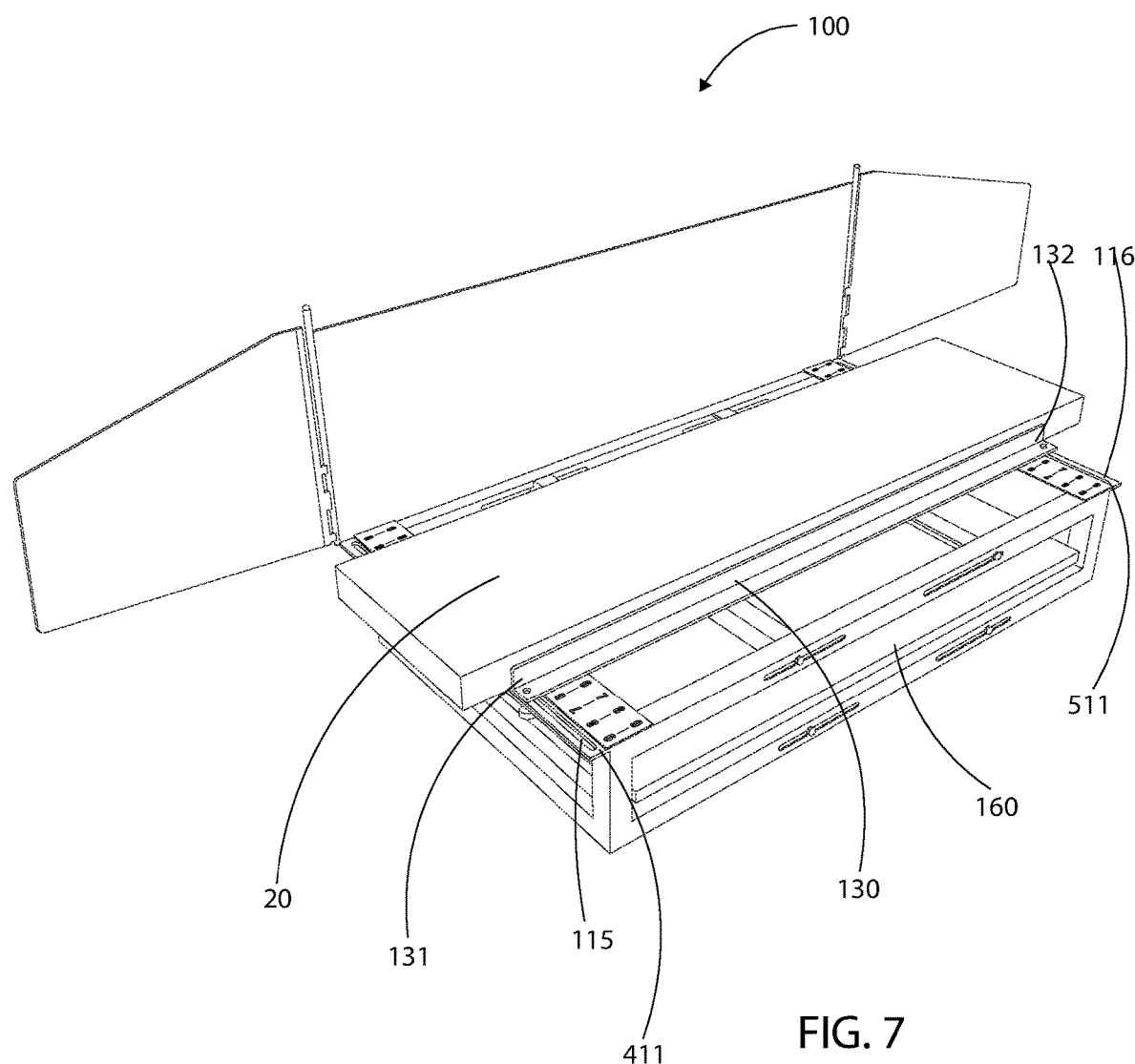
FIG. 7 is a side perspective view of the apparatus illustrating the pair of adjustable clamping members being used to clamp a larger work piece; and the catch tray having been inserted into a space between a top section and a bottom section of the main frame, according to an embodiment of the disclosure.

For example, as shown in FIG. 7, the top left side 411 of the top section 111 may include a left clamp track 115 and the top right side 511 of the top section 111 may include a right clamp track 116. As such, the clamp left side 131 of each of the adjustable clamping members 130 may be attached to the left clamp track 115 and the clamp right side 132 of each of the adjustable clamping members 130 may be attached to the right clamp track 116. Thus, each of the adjustable clamping members 130 may be configured for linear movement about the top section 111 and may be able to, together, clamp the work piece 20 therebetween (or release the work piece 20). For example, as shown in FIG. 6, the pair of adjustable clamping members 130 may be moved close together to clamp a narrow work piece 20; and as shown in FIG. 7, the pair of adjustable clamping members 130 may be moved further apart to clamp a wide work piece 20.

Preferably, a work piece space 134 (FIG. 4) defined between the pair of adjustable clamping members 130 may be adjustable between 0 and 18 inches. As such, the pair of adjustable clamping members 130 may be used to clamp work pieces 20 with widths between 0-18 inches. It should however be appreciated that these measurements are given as examples are not meant to limit the clamping ability of the apparatus 100 in any way.

As shown, the pair of adjustable clamping members 130 may be located atop the top section 111, parallel to the top front side 311 and the top rear side 211 and perpendicular to the top left side 411 and the top right side 511. Further, as shown, in some embodiments, the left clamp track 115 and the right clamp track 116 may extend substantially from the top rear side 211 to the top front side 311 of the top section 111. As such, the pair of adjustable clamping members 130 may be configured to move forward and backward between the top rear side 211 and the top front side 311. In addition to this, as shown, the left clamp track 115 and the right clamp track 116 may include an elongated track opening enabling smooth movement of the pair of adjustable clamping members 130.

In some embodiments, fasteners 150 may be provided for fastening each of the pair of adjustable clamping members 130 in a particular position. Preferably, the fasteners may be quickly and easily fasten-able and removable to prevent unnecessary time spent in adjusting the pair of adjustable clamping members 130. For example, in some embodiments, the fasteners 150 may include thumb knobs (shown specifically in FIG. 3).

Figure 8:
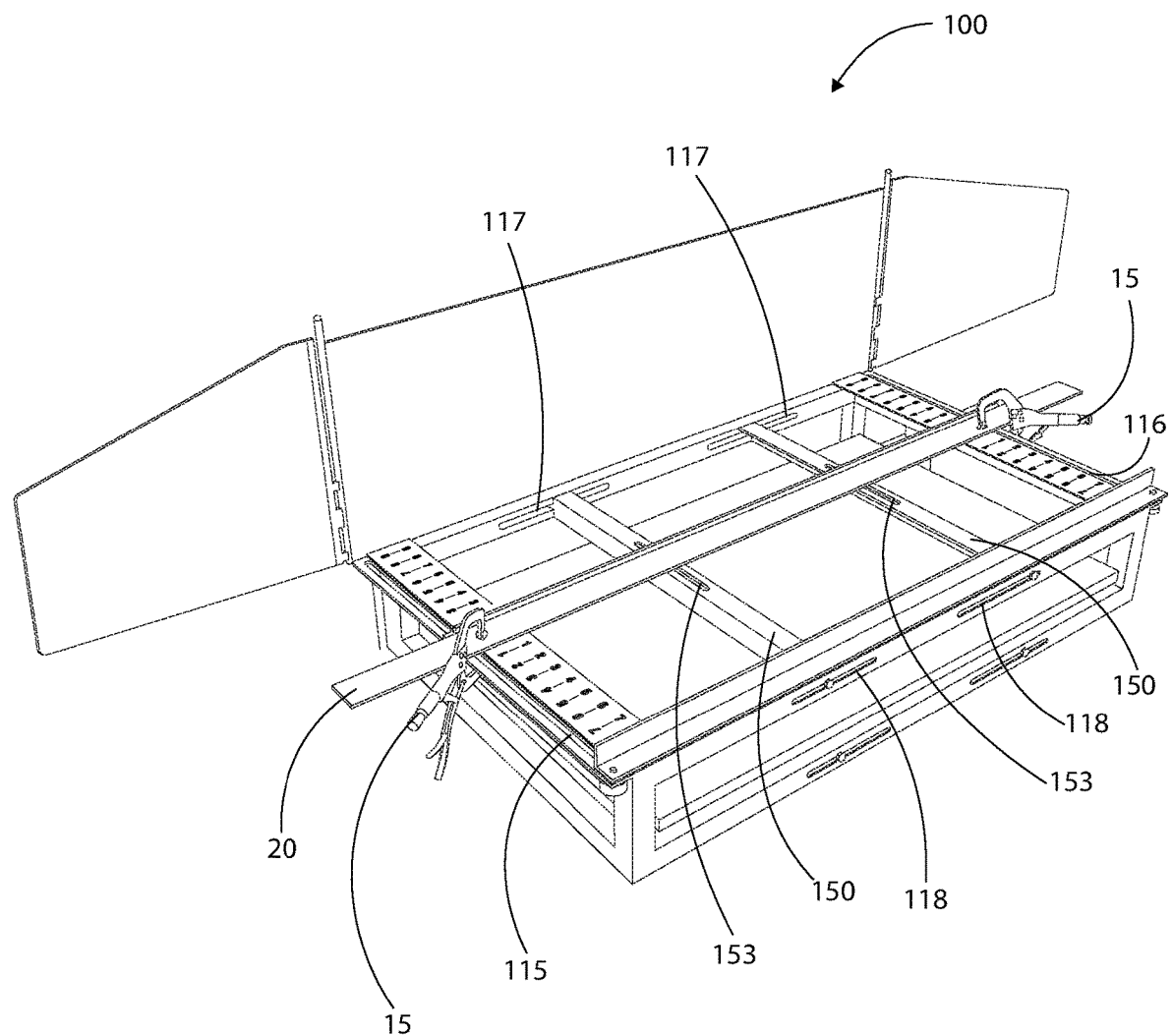
FIG. 8 is a side perspective view of the apparatus illustrating the apparatus being used with existing clamps for clamping the work piece, according to an embodiment of the disclosure.
Figure 9:
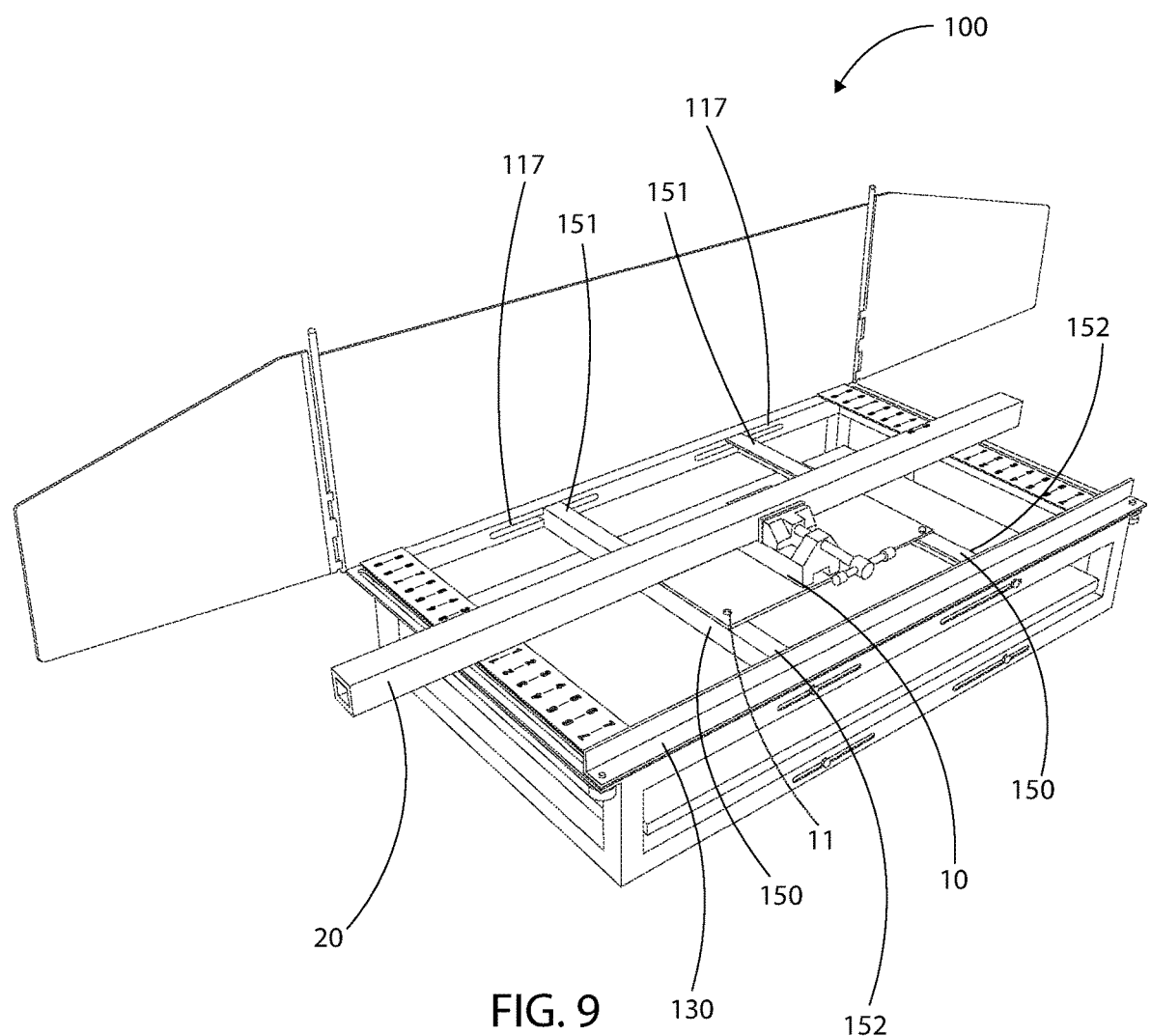
FIG. 9 is a side perspective view of the apparatus illustrating the apparatus being used with an existing vice for clamping the work piece, according to an embodiment of the disclosure.

As above, the apparatus 100 may utilize various means to clamp the work piece 20. For example, as shown in FIG. 8, the apparatus 100 may allow for the use of clamps 15 therewith. In another example, as shown in these figures and particularly in FIGS. 8-9, the apparatus 100 may include the at least one vice attachment bracket 150. The at least one vice attachment bracket 150, as shown in FIG. 9, may enable use of a vice 10 with the apparatus 100.

The at least one vice attachment bracket 150 may be attached about the top section 111 of the main frame 110 and configured to attach the vice 10 to the apparatus 100. Preferably, as shown, the at least one vice attachment bracket 150 may include a pair of vice attachment brackets 150. The pair of vice attachment brackets 150 may each include a vice rear end 151 opposite a vice front end 152 and a second opening 153 configured for alignment with vice bolt apertures 11 on the vice 10 and to receive at least one second bolt (or other suitable fastener) therethrough, thereby attaching the vice 10 to the apparatus 100.

Preferably, the second opening 153 may be elongated to enable vices 10 of various sizes to attach thereto. Further, to aid in this, the pair of vice attachment brackets 150 may also be adjustable relative to each other. For example, the top rear side 211 of the top section 111 may include a first bracket track 117 and the top front side 311 of the top section 111 may include a second bracket track 118. In some embodiments, as shown, the first bracket track 117 may include a pair of first bracket tracks 117 and the second bracket track 118 may include a pair of second bracket tracks 118.

The vice rear end 151 of each of the pair of vice attachment brackets 150 may be attached to the first bracket track 117, and the vice front end 152 of each of the pair of vice attachment brackets 150 may be attached to the second bracket track 118 such that each of the pair of vice attachment brackets 150 are configured for linear movement about the top section 111. As shown, the pair of vice attachment brackets 150 may be perpendicular to the top rear side 211 and the top front side 311, and parallel to the top left side 411 and the top right side 511. As such, the pair of vice attachment brackets 150 may be configured for side to side movement about the apparatus 100 between the top left side 411 and the top right side 511, thereby accommodating a variety of vice 10 sizes.

Figure 10:
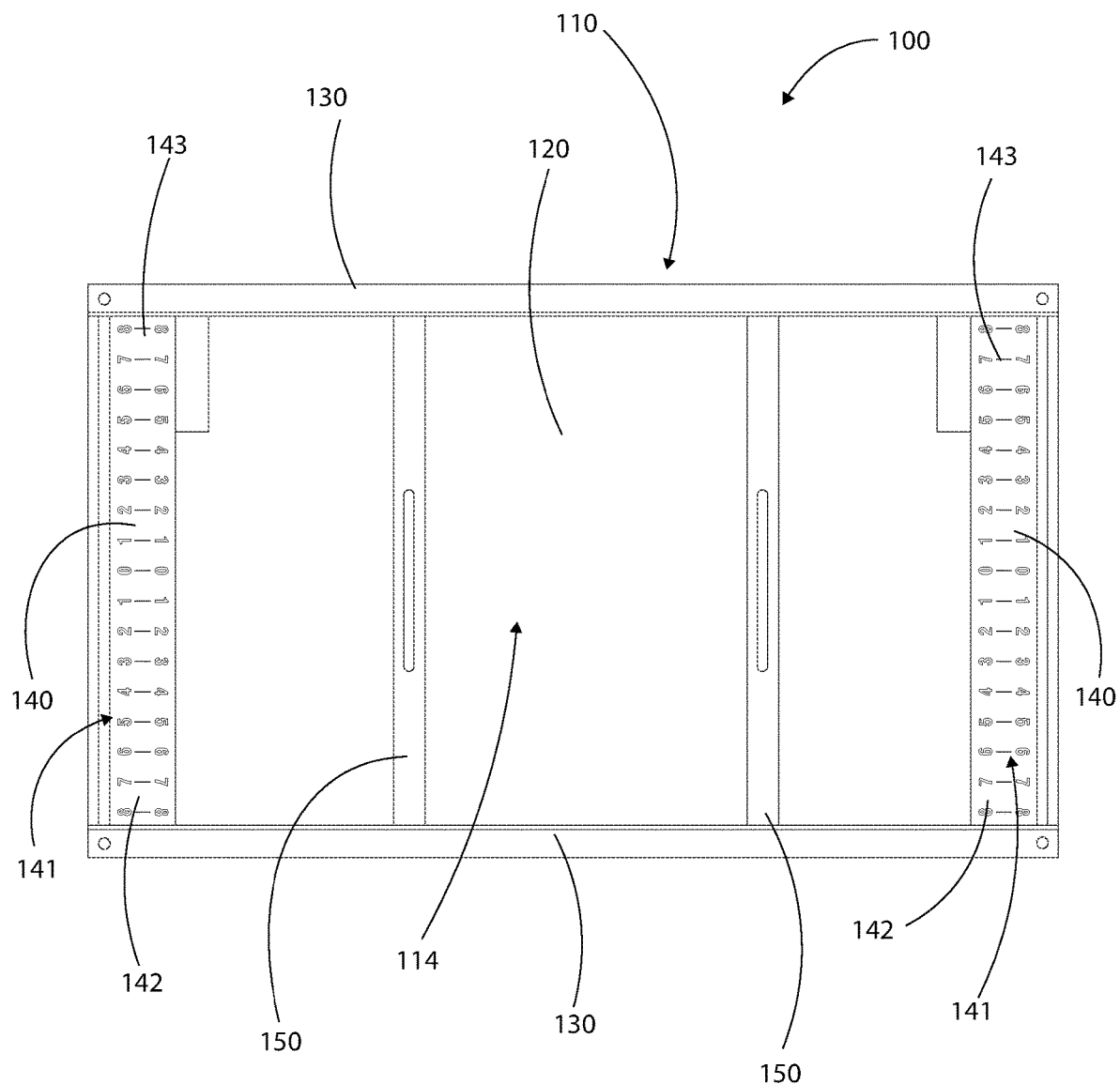
FIG. 10 is a top view of the apparatus illustrating the apparatus including a pair of measurement members at either side of the top section of the main frame, according to an embodiment of the disclosure.

As shown particularly FIG. 10, the at least one measurement member 140 may be attached about the top section 111 of the main frame 110. The at least one measurement member 140 may span between the top rear side 211 and the top front side 311 and may be located at one of the top left side 411 or the top right side 511. Particularly, as shown, the at least one measurement member 140 may include a pair of measurement members 140. As such, one of the pair of measurement members 140 may be located at the top left side 411 of the main frame 110, and another one of the pair of measurement members 140 may be located at the top right side 511 of the main frame 110.

The pair of measurement members 140 may include indicia 141 configured to aid in positioning (and measuring) of the work piece 20. As shown, the pair of measurement members 140 may each include a plurality of numbers ascending from a center thereof on each of a front side 142 and a rear side 143 thereof. Preferably, as shown, the number 0 may begin from the center of each of the pair of measurement members 140 (in line with the chuck 7 of the drill press 5), with equal numbers ascending therefrom on each of the front side 142 and the rear side 143.

In use, the user may attach the apparatus 100 to the drill press 5 by aligning the first opening 121 of the at least one table attachment bracket 120 with table bolt apertures 9 of the table 8 and inserting at least one first bolt therethrough (or other suitable fastener). Particularly, the user may align the first opening 121 of each of the pair of table attachment brackets 120 with the table bolt apertures 9. The user may then clamp a work piece 20 to the apparatus 100, utilizing the at least one measurement member 140 (or preferably the pair of measurement members 140) to position the work piece 20.

The user may clamp the work piece 20 utilizing at least one of the pair of adjustable clamping members 130, the clamps 15, or the vice 10. When using the pair of adjustable clamping members 130, the user may move the pair of adjustable clamping members 130 such that the work piece space 134 is sufficient enough to accommodate the work piece 20. In some embodiments, the user may then fasten the pair of adjustable clamping members 130 to keep them in place. When using existing clamps 15, the user may rest the work piece 20 on the top section 111 of the main frame 110 and clamp the work piece 20 where needed.

When using the existing vice 10, the user may attach the vice 10 to the apparatus 100 using the at least one vice attachment bracket 150. Particularly, the user may move the pair of vice attachment brackets 150 such that second openings 153 thereon align with the vice bolt apertures 11 on the vice 10. The user may then insert at least one second bolt therethrough (or other suitable fastener) to attach the vice 10 to the apparatus 100. The user may then use the vice 10 as usual.

It should be noted that certain steps may be optional and may not be implemented in all cases. It should also be noted that the steps described above can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using an apparatus are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An apparatus comprising:
   a drill press, the drill press including a head and a chuck;
   a main frame attached to the drill press, the main frame including a top section opposite a bottom section joined together via at least one support and defining a space between the top section and the bottom section, the top section including a top rear side opposite a top front side and a top left side opposite a top right side, the top left side including a left clamp track, the top right side including a right clamp track, the bottom section including a bottom rear side opposite a bottom front side and a bottom left side opposite a bottom right side;
   a pair of adjustable clamping members attached about the top section of the main frame, each of the adjustable clamping members including a clamp left side opposite a clamp right side and a clamp length therebetween, the clamp left side of each of the adjustable clamping members attached to the left clamp track and the clamp right side of each of the adjustable clamping members attached to the right clamp track such that each of the adjustable clamping members are configured for linear movement about the top section, the pair of adjustable clamping members together configured to clamp a work piece therebetween;
   at least one measurement member attached about the top section of the main frame, the at least one measurement member spanning between the top rear side and the top front side and located at one of the top left side and top right side, the at least one measurement member including indicia configured to aid in positioning of the work piece; and
   a catch tray configured for removable insertion into the space between the top section and the bottom section, the catch tray being inserted through the front side of the apparatus,
   wherein the drill press further including a table, the table including table bolt apertures, and
   wherein the apparatus further comprising at least one table attachment bracket attached about the bottom section of the main frame, the at least one table attachment bracket including a first opening configured for alignment with table bolt apertures of the table and to receive at least one first bolt therethrough, thereby attaching the apparatus to the drill press.

2. The apparatus of claim 1, wherein the at least one measurement member includes a pair of measurement members, wherein one of the pair of measurement members is located at the top left side of the top section, and wherein another one of the pair of measurement members is located at the top right side of the top section.

3. The apparatus of claim 2, wherein the at least one table attachment bracket includes a pair of table attachment brackets.

4. The apparatus of claim 1, further comprising a shield member attached about the top rear side of the top section.

5. The apparatus of claim 4, wherein the shield member includes a first side panel attached about a shield left side thereof and a second side panel attached about a shield right side thereof.

6. The apparatus of claim 5, wherein the first side panel is pivotably attached to the shield left side, and wherein the second side panel is pivotably attached to the shield right side.

7. The apparatus of claim 6, wherein the shield member is removable.

8. The apparatus of claim 7, wherein the first clamp track and the second clamp track extend substantially from the top rear side to the top front side of the top section.

9. The apparatus of claim 8, wherein a work piece space between the pair of clamping members is adjustable between 0 and 18 inches.

10. An apparatus comprising:
a drill press, the drill press including a head, a chuck, and a table, the table including table bolt apertures;
a main frame attached to the drill press, the main frame including a top section opposite a bottom section joined together via at least one support and defining a space between the top section and the bottom section, the top section including a top rear side opposite a top front side and a top left side opposite a top right side, the top left side including a left clamp track extending substantially from the top rear side to the top front side of the top section, the top right side including a right clamp track extending substantially from the top rear side to the top front side of the top section, the bottom section including a bottom rear side opposite a bottom front side and a bottom left side opposite a bottom right side;
a pair of adjustable clamping members attached about the top section of the main frame, each of the adjustable clamping members including a clamp left side opposite a clamp right side and a clamp length therebetween, the clamp left side of each of the adjustable clamping members attached to the left clamp track and the clamp right side of each of the adjustable clamping members attached to the right clamp track such that each of the adjustable clamping members are configured for linear movement about the top section, the pair of adjustable clamping members together configured to clamp a work piece therebetween; and
at least one measurement member attached about the top section of the main frame, the at least one measurement member spanning between the top rear side and the top front side and located at one of the top left side and top right side, the at least one measurement member including indicia configured to aid in positioning of the work piece;
at least one table attachment bracket attached about the bottom section of the main frame, the at least one table attachment bracket including a first opening configured for alignment with table bolt apertures of the table and to receive at least one first bolt therethrough, thereby attaching the apparatus to the drill press;
at least one vice attachment bracket attached about the top section of the main frame and configured to attach a vice to the apparatus, the at least one vice attachment bracket including a vice rear end opposite a vice front end and a second opening configured for alignment with vice bolt apertures on the vice and to receive at least one second bolt therethrough, thereby attaching the vice to the apparatus;
a catch tray configured for removable insertion into the space between the top section and the bottom section, the catch tray being inserted through the front side of the apparatus; and
a shield member attached about the top rear side of the top section, the shield member including a first side panel pivotably attached about a shield left side thereof and a second side panel pivotably attached about a shield right side thereof.

11. The apparatus of claim 10, further comprising at least one vice attachment bracket attached about the top section of the main frame and configured to attach a vice to the apparatus, the at least one vice attachment bracket including a vice rear end opposite a vice front end and a second opening configured for alignment with vice bolt apertures on the vice and to receive at least one second bolt therethrough, thereby attaching the vice to the apparatus.

12. The apparatus of claim 11, wherein the at least one vice attachment bracket includes a pair of vice attachment brackets.

13. The apparatus of claim 12, wherein the top rear side includes a first bracket track, and the top front side includes a second bracket track, wherein the vice rear end of each of the pair of vice attachment brackets is attached to the first bracket track, and wherein the vice front end of each of the pair of vice attachment brackets is attached to the second bracket track such that each of the pair of vice attachment brackets are configured for linear movement about the top section.

14. The apparatus of claim 10, wherein the at least one vice attachment bracket includes a pair of vice attachment brackets, wherein the top rear side includes a first bracket track, and the top front side includes a second bracket track, wherein the vice rear end of each of the pair of vice attachment brackets is attached to the first bracket track, and wherein the vice front end of each of the pair of vice attachment brackets is attached to the second bracket track such that each of the pair of vice attachment brackets are configured for linear movement about the top section.

15. The apparatus of claim 14, wherein the at least one measurement member includes a pair of measurement members, wherein one of the pair of measurement members is located at the top left side of the top section, and wherein another one of the pair of measurement members is located at the top right side of the top section.

16. The apparatus of claim 15, wherein the at least one table attachment bracket includes a pair of table attachment brackets.

17. The apparatus of claim 16, wherein the shield member is removable.

18. The apparatus of claim 17, wherein a work piece space between the pair of clamping members is adjustable between 0 and 18 inches.

* * * * *